(12) United States Patent
Ohn et al.

(10) Patent No.: US 12,510,996 B2
(45) Date of Patent: Dec. 30, 2025

(54) DRIVING CIRCUIT FOR CHANGING FREQUENCY, METHOD FOR OPERATING THE SAME, AND DISPLAY DEVICE INCLUDING THE SAME

(71) Applicant: SAMSUNG DISPLAY CO., LTD., Yongin-si (KR)

(72) Inventors: Won Jong Ohn, Yongin-si (KR); Moon Chul Park, Yongin-si (KR); Sang Woo Kim, Yongin-si (KR); In Won Jin, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 112 days.

(21) Appl. No.: 18/603,271

(22) Filed: Mar. 13, 2024

(65) Prior Publication Data
US 2025/0077027 A1 Mar. 6, 2025

(30) Foreign Application Priority Data
Sep. 6, 2023 (KR) .......... 10-2023-0118317

(51) Int. Cl.
*G06F 3/041* (2006.01)
*G06F 3/044* (2006.01)

(52) U.S. Cl.
CPC ........ *G06F 3/04184* (2019.05); *G06F 3/0412* (2013.01); *G06F 3/0446* (2019.05)

(58) Field of Classification Search
CPC .. G06F 3/04184; G06F 3/0412; G06F 3/0446; G06F 3/0418; G06F 3/0488; G06F 3/0416; G09G 3/32; G09G 3/3208; G09G 3/36; G09G 3/2092; G09G 2330/06; G09G 2354/00; G09G 2370/00
See application file for complete search history.

(56) References Cited

U.S. PATENT DOCUMENTS

| 9,766,730 | B2 | 9/2017 | Lee | |
|---|---|---|---|---|
| 2010/0110040 | A1* | 5/2010 | Kim | G06F 1/3237 345/174 |
| 2018/0335939 | A1* | 11/2018 | Karunamuni | G06F 9/445 |
| 2019/0034002 | A1* | 1/2019 | Anantharaman | G06F 1/32 |
| 2022/0019315 | A1* | 1/2022 | Gray | G01V 3/08 |

FOREIGN PATENT DOCUMENTS

KR 10-2338362 12/2021

* cited by examiner

*Primary Examiner* — Andrew Sasinowski
(74) *Attorney, Agent, or Firm* — F. CHAU & ASSOCIATES, LLC

(57) ABSTRACT

A driving circuit includes a sensor driver and a display driver. The sensor driver outputs a touch signal, and the display driver receives a first interface signal from a processor and outputs a feedback signal to the processor. The feedback signal is output when a first frequency of the first interface signal and a second frequency of the touch signal received from the sensor driver match. The third frequency is different from the first frequency.

20 Claims, 6 Drawing Sheets

DRIVING CIRCUIT FOR CHANGING FREQUENCY, METHOD FOR OPERATING THE SAME, AND DISPLAY DEVICE INCLUDING THE SAME

CROSS-REFERENCE TO RELATED APPLICATION

This application claims priority to and the benefit of Korean Patent Application No. 10-2023-0118317, filed in the Korean Intellectual Property Office on Sep. 6, 2023, the entire contents of which are herein incorporated by reference.

BACKGROUND OF THE INVENTION

1. Technical Field

One or more embodiments described herein relate to a driving circuit for changing frequency, a method for operating the same, and a display device including the same.

2. Description of the Related Art

Displays are used in many electronic devices. Examples of displays include liquid crystal display devices and organic light emitting display devices. Many of these devices include touch sensors.

In operation, touch signals supplied to electrodes of a touch sensor may act as electronic interference (EMI) (or noise) for components inside the touch sensor, the display device, and/or components of a host electronic device. This noise may reduce the reliability of operations performed by the touch sensor, display device, and/or electronic device.

SUMMARY OF THE INVENTION

One or more embodiments of the present disclosure provide a display driver that changes the frequency of an internal signal of a display device to prevent interference with the frequency of a touch signal. A method for operating the same, and a display device including the same is also provided.

In accordance with one or more embodiments of the present disclosure, a driving circuit includes a sensor driver that outputs a touch signal, and a display driver that receives a first interface signal from a processor, and that outputs a feedback signal indicating a third frequency to the processor when a first frequency of the first interface signal and a second frequency of the touch signal received from the sensor driver match, the third frequency being different from the first frequency.

The display driver receives a second interface signal generated based on the third frequency from the processor, and a time point at which a logic level of the second interface signal changes and a time point at which a logic level of the touch signal changes are different.

The display driver includes a frequency counter that calculates the first frequency of the first interface signal and the second frequency of the touch signal; a comparator that outputs a change signal depending on whether the first frequency and the second frequency match; and a frequency generator that generates the feedback signal representing the third frequency when receiving the change signal.

The comparator outputs the change signal to the frequency generator when the first frequency and the second frequency match.

The frequency generator generates the third frequency by adding a margin frequency to the first frequency.

The frequency generator generates the third frequency by subtracting a margin frequency from the first frequency.

The frequency counter calculates the first frequency by counting a number of toggling times of a reference clock signal during a first reference time, and calculates the second frequency by counting a number of toggling times of the reference clock signal during a second reference time.

The frequency counter includes an oscillator that generates the reference clock signal; and a counter that counts a number of toggling times of the reference clock signal during the first reference time and counts a number of toggling times of the reference clock signal during the second reference time.

The display driver communicates with the processor through a mobile industry processor interface (MIPI) interface.

In accordance with one or more embodiments of the present disclosure provides a method for operating a display driver that communicates with a processor and a sensor driver, including: receiving a first interface signal from the processor; receiving a touch signal from the sensor driver; comparing whether a first frequency of the first interface signal and a second frequency of the touch signal match; and when the first frequency and the second frequency match, outputting a feedback signal indicating a third frequency different from the first frequency to the processor.

The method may further include after outputting the third frequency to the processor, receiving a second interface signal generated based on the third frequency from the processor, wherein a time point at which a logic level of the second interface signal changes and a time point at which a logic level of the touch signal changes are different.

The method may further include upon receiving the first interface signal from the processor, calculating the first frequency of the first interface signal; and upon receiving the touch signal from the display driver, calculating the second frequency of the touch signal.

Generating the third frequency may include generating the third frequency by adding a margin frequency to the first frequency.

Generating the third frequency may include generating the third frequency by subtracting a margin frequency to the first frequency.

The display driver communicates with the processor through a mobile industry processor interface (MIPI) interface.

In accordance with one or more embodiments of the present disclosure, a display device includes a display driver that displays an image on a display portion based on a first interface signal received from a processor, and a sensor driver that generates sensing data by detecting a touch adjacent to a sensor portion through a touch signal, wherein the display driver outputs a feedback signal indicating a third frequency to the processor when a first frequency of the first interface signal and a second frequency of the touch signal received from the sensor driver match, the third frequency being different from the first frequency.

The display driver receives a second interface signal generated based on the third frequency from the processor, and a time point at which a logic level of the second interface signal changes and a time point at which a logic level of the touch signal changes are different.

The display driver includes a frequency counter that calculates the first frequency of the first interface signal and the second frequency of the touch signal; a comparator that outputs a change signal depending on whether the first frequency and the second frequency match; and a frequency generator that generates the feedback signal representing the third frequency when receiving the change signal.

The comparator outputs the change signal to the frequency generator when the first frequency and the second frequency match.

The frequency generator generates the third frequency by adding a margin frequency to the first frequency.

In accordance with one or more embodiments of the present disclosure, the display driver may be coupled to a first wire and a second wire, the first wire coupling the display driver to the processor and the second wire coupling the display driver to a touch sensor, and wherein the first wire overlaps the second wire.

In accordance with one or more embodiments, an apparatus includes a driving circuit coupled to a first wire and a second wire, the first wire coupling the driving circuit to a processor and the second wire coupling the driving circuit to a touch sensor. The first wire may overlap the second wire. The driving circuit may generate a feedback signal when a first frequency of a first interface signal carried by the first wire is equal to a second frequency of a touch signal carried by the second wire, and may receive a second interface signal having a third frequency carried by the first wire in response to the feedback signal, the third frequency being different from the first frequency. The feedback signal may include information indicating a target frequency that corresponds to the third frequency. The driving circuit may include a comparator configured to compare the first frequency and the second frequency and generate the feedback signal when the comparator indicates that the first frequency is equal to the second frequency.

According to the driving circuit, the method for operating the same, and the display device including the same of the present disclosure, the display device may prevent interference that occurs when detecting a touch by making frequencies of a touch signal and an interface signal different.

DETAILED DESCRIPTION OF THE EMBODIMENTS

Figure 1:
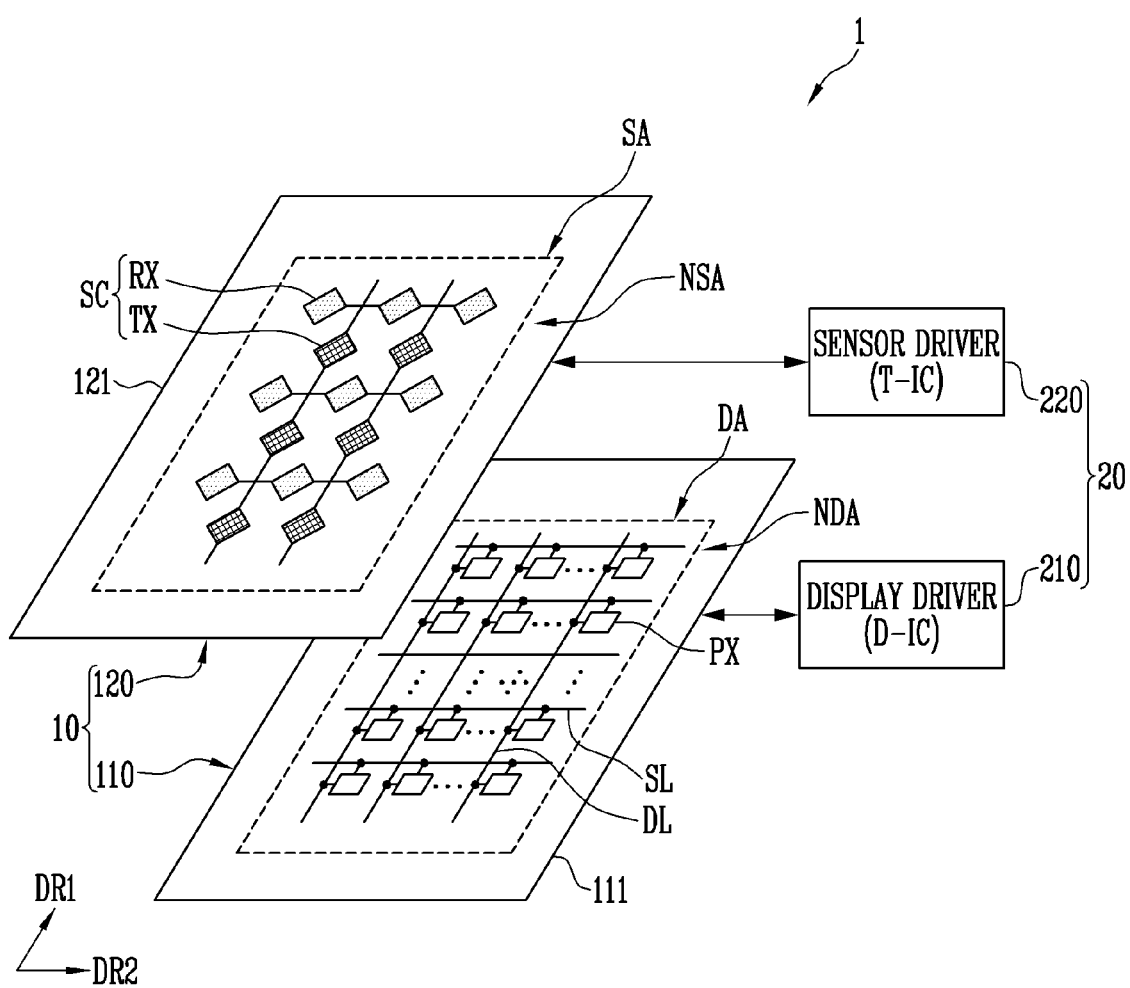
FIG. 1 illustrates a block diagram of a display device according to an embodiment of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In the drawings, parts or portion unrelated to the present disclosure are omitted to clarify the description of the present disclosure, and like reference numerals designate like constituent elements throughout the specification.

In addition, terms such as "unit" and "module" used below or functional blocks illustrated in drawings may be implemented in the form of a software configuration, a hardware configuration, or a combination thereof. In order to clearly describe the technical idea of the present disclosure, detailed descriptions of overlapping constituent elements are omitted.

FIG. 1 illustrates a block diagram of a display device 1 according to an embodiment of the present disclosure.

Referring to FIG. 1, the display device 1 includes a panel 10 and a driving circuit 20 for driving the panel 10. In addition, the display device 1 may further include a processor or may be connected to the processor, which, for example, may be located outside of the panel 10.

The panel 10 may include a display unit 110 for displaying an image and a sensor unit 120 for sensing an input, which, for example, may take the form of a touch, application of pressure, a fingerprint, hovering, biometric information (or biometric characteristics), and the like. For example, the display unit 110 may include pixels PX, and the sensor unit 120 may include sensors SC disposed to overlap at least some of the pixels PX. In the embodiment, the sensors SC may include first sensors TX (or driving electrodes) and second sensors RX (or sensing electrodes). In one embodiment (for example, when the sensor unit 120 operates in a self-capacitance mode), the sensors SC may be configured as one type of sensors without distinction between the first sensors TX and the second sensors RX.

The driving circuit 20 may include a display driver 210 (D-IC) for driving the display unit 110 and a sensor driver 220 (T-IC) for driving the sensor unit 120. In some embodiments, the display unit 110 and the sensor unit 120 may be separately manufactured from each other, and then may be disposed and/or be combined so that at least one area thereof overlaps each other. In one embodiment, the display unit 110 and the sensor unit 120 may be integrally manufactured. For example, the sensor unit 120 may be directly formed on at least one substrate (for example, an upper substrate and/or lower substrate of a display panel, or a thin film encapsulation layer) forming the display unit 110 or other insulating layers or various functional films (for example, an optical layer or a passivation layer).

Meanwhile, in FIG. 1, the sensor unit 120 is shown to be disposed on a front surface (for example, an upper surface on which an image is displayed) of the display unit 110, but the position of the sensor unit 120 is not limited thereto. For example, in another embodiment, the sensor unit 120 may be disposed on a rear surface or respective surfaces of the display unit 110. In another embodiment, the sensor unit 120 may be disposed on at least one edge area of the display unit 110.

The display unit 110 may include a display substrate 111 and a plurality of pixels PX formed on the display substrate 111. The pixels PX may be disposed in a display area DA of the display substrate 111. The display substrate 111 may include the display area DA in which an image is displayed and a non-display area NDA outside (e.g., adjacent to) the display area DA. In some embodiment, the display area DA may be disposed in a central area of the display unit 110, and the non-display area NDA may be disposed in an edge (or bezel) area of the display unit 110 so as to partially or entirely surround the display area DA.

The display substrate 111 may be a rigid substrate or a flexible substrate, and its material or physical properties are not particularly limited. For example, the display substrate 111 may be a rigid substrate made of glass or tempered glass, or a flexible substrate formed of a thin film made of plastic or a metallic material.

The display area DA includes scan lines SL and data lines DL connected to respective ones of the pixels PX. The pixels PX are selected by a scan signal of a turn-on level supplied from the scan lines SL. When a pixel PX are selected by a scan signal, the pixel PX may receive a data signal from the data lines DL, to emit light with a luminance corresponding to the data signal. When combined with light emitted from the other pixels, an image may be displayed in the display area DA. In the present disclosure, the structure and driving method of pixels PX are not particularly limited. For example, the pixels PX may have various structures or arrangement of sub-pixels and may be driven by various driving methods.

In the non-display area NDA, various wires may be included and connected to the pixels PX of the display area DA and/or internal circuit portions. For example, in the non-display area NDA, a plurality of wires for supplying various power sources and control signals to the display area DA may be disposed. In addition, one or more drivers (e.g., a scan driver, an emission driver, and/or the like) may be further disposed in the non-display area NDA.

In the present disclosure, the type of the display unit 110 is not particularly limited. For example, the display unit 110 may be implemented as a self light emitting type display panel such as an organic light emitting display panel. However, when the display unit 110 is implemented as a self light emitting type, each of the pixels PX is not limited to a case where only an organic light emitting element is included. For example, the light emitting element of each of the pixels PX may include an organic light emitting diode, an inorganic light emitting diode, and a quantum dot/well light emitting diode. A plurality of light emitting elements may be provided in each of the pixels PX. In this case, the plurality of light emitting elements may be connected in series, in parallel, or in series/parallel. Alternatively, the display unit 110 may be implemented as a non-light emitting type of display panel such as a liquid crystal display panel. When the display unit 110 is implemented in a non-light emitting type, the display device 1 may additionally include a light source such as a backlight unit.

The sensor unit 120 includes a sensor substrate 121 and the plurality of sensors SC formed on sensor substrate 121. The sensors SC may be disposed in a sensing area SA on the sensor substrate 121. As shown, the sensing area overlaps all or a portion of the display area DA.

The sensor substrate 121 may include the sensing area SA capable of sensing a touch input or the like, and a peripheral area NSA outside (e.g., adjacent to or surrounding) the sensing area SA. In some embodiments, the sensing area SA may be disposed to overlap at least one area of the display area DA. For example, the sensing area SA may be set as an area corresponding to the display area DA (for example, an area overlapping the display area DA), and the peripheral area NSA may be set as an area corresponding to the non-display area NDA (for example, an area overlapping the non-display area NDA). In this case, when a touch input or the like is provided on the display area DA, it is possible to detect the touch input through the sensor unit 120.

The sensor substrate 121 may be a rigid or flexible substrate, and may be configured as at least one insulating film. In addition, the sensor substrate 121 may be a transparent or translucent transmissive substrate, but is not limited thereto. In the present disclosure, the material and physical properties of the sensor substrate 121 are not particularly limited. For example, the sensor substrate 121 may be a rigid substrate made of glass or tempered glass, or a flexible substrate formed of a thin film made of plastic or a metallic material. In addition, in some embodiments, at least one substrate forming the display unit 110 (for example, the display substrate 111, an encapsulation substrate and/or a thin film encapsulation layer), or at least one layer of insulating film or functional film disposed on an inner and/or outer surface of the display unit 110, may be used as the sensor substrate 121.

The sensing area SA is an area capable of reacting to a touch input (that is, corresponds to an active area of the sensor unit). To this end, the sensors SC for sensing the touch input or the like may be disposed in the sensing area SA. In some embodiments, the sensors SC may include the first sensors TX and the second sensors RX.

For example, respective first sensors TX may extend in a first direction DR1 and may be arranged in a second direction DR2. The second direction DR2 may be different from the first direction DR1. For example, the second direction DR2 may be a direction crossing the first direction DR1. In another embodiment, the extension direction and arrangement direction of the first sensors TX may have a different configuration.

For example, each second sensor RX may extend in the second direction DR2 and may be arranged in the first direction DR1. In another embodiment, the extension direction and arrangement direction of the second sensors RX may have a different configuration. In FIG. 1, each second cell is illustrated in a diamond shape, but may be configured in various other shapes such as a circle, a quadrangle, a triangle, and a mesh form.

In some embodiments, each of the first sensors TX and second sensors RX may have conductivity by including at least one of a metallic material, a transparent conductive material, and/or various other conductive materials. For example, the first sensors TX and the second sensors RX may include at least one of various metallic materials such as gold (Au), silver (Ag), aluminum (Al), molybdenum (Mo), chromium (Cr), titanium (Ti), nickel (Ni), neodymium (Nd), copper (Cu), and platinum (Pt), or an alloy thereof. In this case, the first sensors TX and the second sensors RX may be configured, for example, in a mesh form. In addition, the first sensors TX and the second sensors RX may include at least one of various transparent conductive materials such as a silver nanowire (AgNW), an indium tin oxide (ITO), an indium zinc oxide (IZO), an indium gallium zinc oxide (IGZO), an antimony zinc oxide (AZO), an indium tin zinc oxide (ITZO), a zinc oxide (ZnO), a tin oxide ($SnO_2$), a carbon nano tube, and a graphene. In addition, the first sensors TX and the second sensors RX may have conductivity by including at least one of various conductive materials. In addition, each of the first sensors TX and the second sensors RX may be made of a single layer or multilayer, and the cross-sectional structure thereof is not particularly limited.

In the peripheral area NSA of the sensor unit 120, sensor lines for electrically connecting the first and second sensors TX and RX to the sensor driver 220 and the like may be disposed according to a predetermined arrangement.

The driving circuit 20 may include the display driver 210 for driving the display unit 110 and the sensor driver 220 for driving the sensor unit 120. In the embodiment, the display driver 210 and the sensor driver 220 may be configured of separate integrated chips from each other. In another embodiment, at least a portion of the display driver 210 and the sensor driver 220 may be integrated together in one integrated circuit (IC).

The display driver 210 is electrically connected to the display unit 110 to drive the pixels PX. For example, the display driver 210 may include a data driver and a timing controller, and a scan driver may be separately mounted in the non-display area NDA of the display unit 110. In another embodiment, the display driver 210 may include all or at least some of the data driver, the timing controller, and the scan driver. The display driver 210 may receive image data and control signals from the processor.

The sensor driver 220 is electrically connected to the sensor unit 120 to drive the sensor unit 120. The sensor driver 220 may generate sensing data by sensing a touch adjacent to the sensor unit 120 through a touch signal. The sensor driver 220 may include a sensor transmitter and a sensor receiver. In some embodiments, the sensor transmitter and the sensor receiver may be integrated into one IC, but the present disclosure is not limited thereto.

The sensor driver 220 may supply control signals to the sensor transmitter and the sensor receiver so that the sensor unit 120 may sense a touch. The sensor transmitter may supply touch signals to the first sensors TX (and/or the second sensors RX), and the sensor receiver may receive sensing signals corresponding to the touch signals from the second sensors RX (and/or the first sensors TX).

Figure 2:
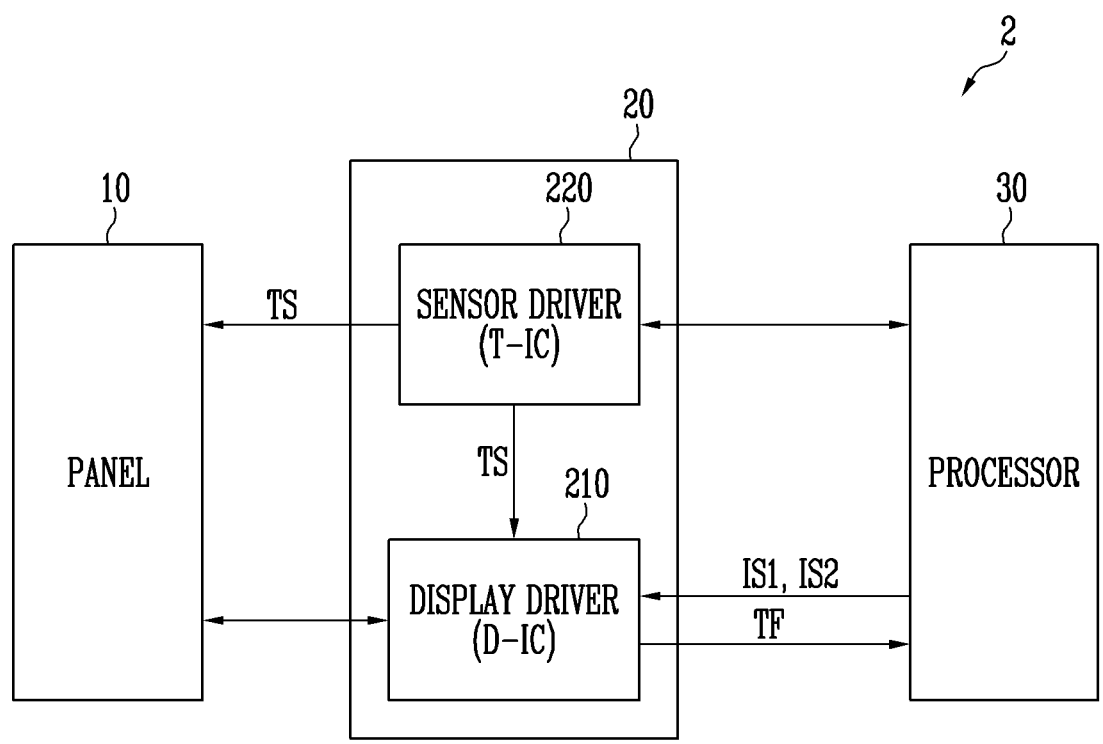
FIG. 2 illustrates a block diagram of a display device according to an embodiment of the present disclosure.

FIG. 2 illustrates a block diagram of a display device 2 according to an embodiment of the present disclosure.

Referring to FIG. 2, the display device 2 may include a panel 10, a driving circuit 20, and a processor 30. Hereinafter, the panel 10 and the driving circuit 20 of FIG. 2 may be described similarly to the panel 10 and the driving circuit 20 of FIG. 1, and redundant descriptions will be simplified or omitted.

The processor 30 may control operations of the display driver 210 and the sensor driver 220. For example, the processor 30 may correspond to at least one of a graphics processing unit (GPU), a central processing unit (CPU), and an application processor (AP).

The processor 30 may output grayscales and timing signals for each display frame period to the display driver 210. The processor 30 may analyze the sensing data received from the sensor driver 220 to perform an operation corresponding to a touch input.

The processor 30 may communicate with each of the display driver 210 and the sensor driver 220 through at least one communication interface. For example, the processor 30 may communicate with the display driver 210 through the mobile industry processor interface (MIPI) protocol. The display driver 210 may display an image on the display portion of the panel 10 based on the interface signal received from the processor 30.

In one embodiment, the processor 30 may communicate with the sensor driver 220 through an inter-integrated circuit (I2C) interface or a serial peripheral interface (SPI) interface. Depending on the structure of the display device 2, a wire through which a touch signal TS is transmitted from the sensor driver 220 to the panel 10 and a wire through which a first interface signal IS1 is transmitted from the processor 30 to the display driver 210 may overlap, for example, in a layout view. The first interface signal IS1 may be a signal for the processor 30 to control the display driver 210. The touch signal TS may be a signal that the sensor driver 220 outputs to the panel 10 to sense the touch provided to the panel 10.

When the first interface signal IS1 and the touch signal TS have the same frequency (in the structure in which the wires through which the first interface signal IS1 and the touch signal TS are transmitted overlap), interference by the first interface signal IS1 may occur when sensing a touch based on the touch signal TS. As a result, accuracy of the operation of sensing the touch provided to the panel 10 may be adversely affected.

To prevent this, the display driver 210 may detect whether the first interface signal IS1 and the touch signal TS have a same frequency, and may then perform a frequency change operation based on the result. For example, when the first frequency of the first interface signal IS1 and the second frequency of the touch signal TS are the same, the display driver 210 may inform the processor 30 of a target frequency TF that is different from the first frequency.

The display driver 210 may inform the processor of the target frequency TF by outputting a feedback signal indicating the target frequency TF to the processor 30. The target frequency TF may have one of various digital or analog forms. For example, the display driver 210 may output a pulse signal with the target frequency TF to the processor 30. As another example, the display driver 210 may output data bits indicating the target frequency TF to the processor 30.

The processor 30 may output a second interface signal IS2 at the target frequency TF to the display driver 210. For example, since the display driver 210 and the processor 30 communicate through the second interface signal IS2 having a frequency different from that of the touch signal TS, interference by the second interface signal IS2 may be prevented, even if wires through which the second interface signal IS2 and the touch signal TS are transmitted overlap.

Figure 3:
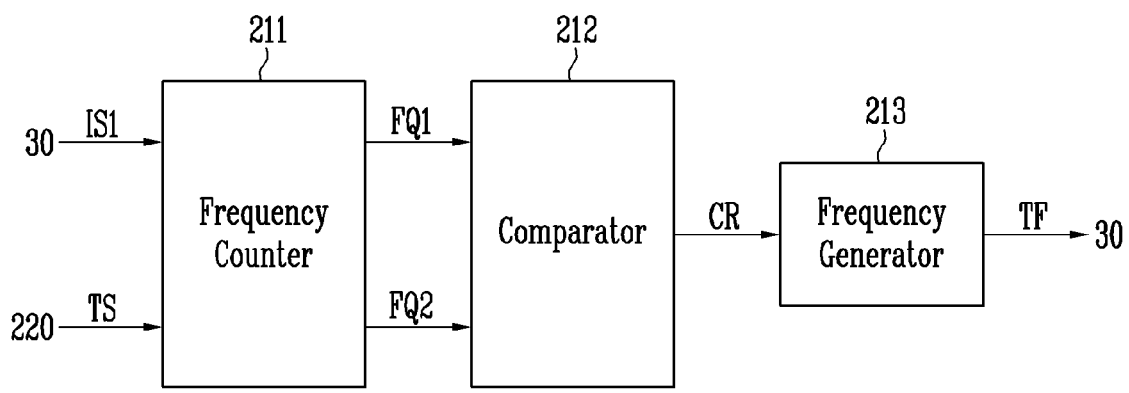
FIG. 3 illustrates a block diagram of a structure of a display driver according to an embodiment of the present disclosure.

FIG. 3 illustrates a block diagram of a structure of the display driver 210 according to the embodiment of the present disclosure.

Referring to FIG. 3, the display driver 210 may include a frequency counter 211, a comparator 212, and a frequency generator 213. The frequency counter 211 may receive the first interface signal IS1 from the processor 30. The frequency counter 211 may receive the touch signal TS from the sensor driver 220.

The frequency counter 211 may generate a first frequency FQ1 by calculating the frequency of the first interface signal IS1. The frequency counter 211 may generate a second frequency FQ2 by calculating the frequency of the touch signal TS. The frequency counter 211 may inform the comparator 212 of the first frequency FQ1 and the second frequency FQ2.

The comparator 212 may compare whether the first frequency FQ1 and the second frequency FQ2 match. When the first frequency FQ1 and the second frequency FQ2 match, the comparator 212 may output a change signal CR to the frequency generator 213. When the first frequency FQ1 and the second frequency FQ2 do not match, the comparator 212 may not output the change signal CR to the frequency generator 213.

When the frequency generator 213 receives the change signal CR, it may generate the target frequency TF. The frequency generator 213 may generate the target frequency TF by adding or subtracting a predetermined margin frequency to or from the first frequency FQ1. In one embodiment, the target frequency TF may be a frequency at which a predetermined amount (e.g., the least) interference occurs in the second frequency FQ2 of the touch signal TS. The frequency generator 213 may inform the processor 30 of the target frequency TF.

Figure 4:
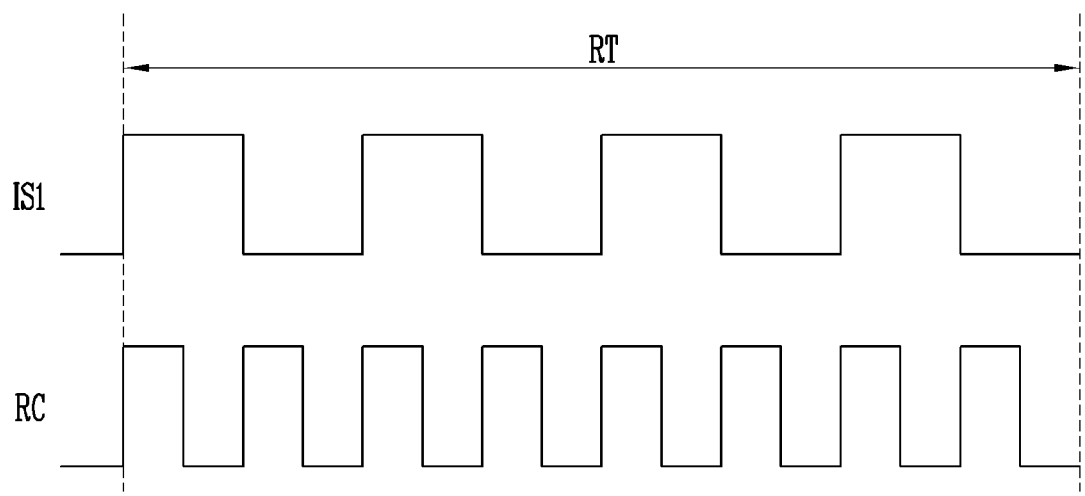
FIG. 4 illustrates a timing diagram of an operation of a frequency counter of FIG. 3 according to an embodiment of the present disclosure.

FIG. 4 illustrates a timing diagram for operation of the frequency counter 211 of FIG. 3.

Referring to FIG. 4, the operation of the frequency counter 211 is shown that calculates the frequency of the first interface signal IS1 based on a reference clock signal RC. The frequency counter 211 may calculate the frequency of the first interface signal IS1 by counting the number of toggling times (or the number of rising or falling edges) of the reference clock signal RC during the reference time. For example, the reference time may correspond to a multiple of a period of the first interface signal IS1. In an embodiment, the frequency counter 211 may include an oscillator that generates the reference clock signal RC and a counter that counts the number of toggling times (or the number of rising edges) of the reference clock signal RC during the reference time RT.

FIG. 4 illustrates only the operation where the frequency counter 211 calculates the frequency of the first interface signal IS1. The frequency counter 211 may calculate the frequency of the touch signal TS in a similar manner, e.g., based on the reference clock signal RC. For example, the frequency counter 211 may calculate the frequency of the touch signal TS by counting the number of toggling times (or the number of rising edges) of the reference clock signal RC for a time corresponding to a multiple of the period of the touch signal TS.

Figure 5:
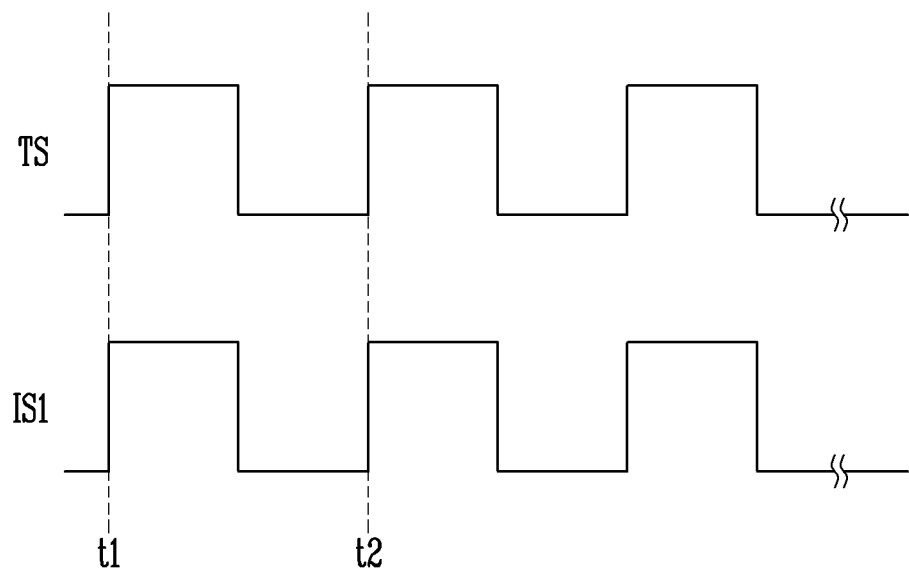
FIG. 5 illustrates a timing diagram of an embodiment of a first interface signal and a touch signal according to an embodiment of the present disclosure.

FIG. 5 illustrates a timing diagram of an embodiment of the first interface signal IS1 and the touch signal TS.

Referring to FIG. 3 and FIG. 5, the first interface signal IS1 received by the display driver 210 from the processor 30 and the touch signal TS received by the display driver 210 from the sensor driver 220 are illustrated.

The first interface signal IS1 may have a first frequency FQ1, and the touch signal TS may have a second frequency FQ2. The period of the first interface signal IS1 may correspond to the length of a period between a time point t1 and a time point t2. The period of the touch signal TS may be the length of the section between the time point t1 and the time point t2. For example, when the first frequency FQ1 and the second frequency FQ2 are the same, the period of the first interface signal IS1 and the period of the touch signal TS may be the same. The time point t1 may be a time point when the display driver 210 receives the first interface signal IS1 and the touch signal TS.

Referring to the time point t2, the logic level of the first interface signal IS1 may be changed, e.g., from a low level to a high level. For example, the time point t2 may be a time point of the rising edge of the first interface signal IS1. Referring to the time point t2, a logic level of the touch signal TS may be changed, e.g., from a low level to a high level. For example, the time point t2 may be a time point of the rising edge of the touch signal TS.

When the time points at which respective logic levels of the first interface signal IS1 and the touch signal TS change are the same, interference caused by the first interface signal IS1 may occur when a touch is detected based on the touch signal TS. Accordingly, in accordance with one or more embodiments, the display device may control the second interface signal IS2 to have a frequency different from the second frequency FQ2 of the touch signal TS.

Figure 6:
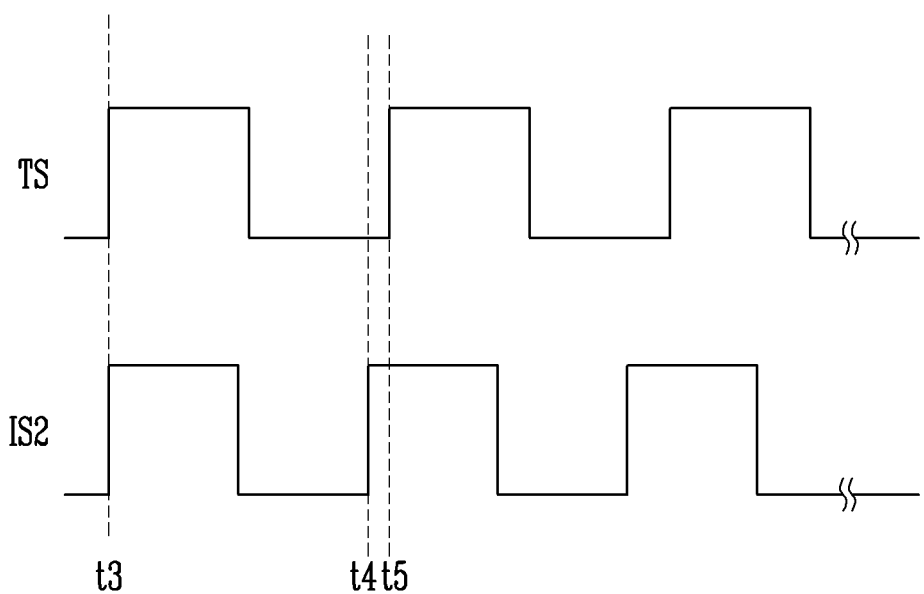
FIG. 6 illustrates a timing diagram of an embodiment of a second interface signal and a touch signal according to an embodiment of the present disclosure.

FIG. 6 illustrates a timing diagram of an embodiment of the second interface signal IS2 and a touch signal TS.

Referring to FIG. 3 and FIG. 6, the second interface signal IS2 received by the display driver 210 from the processor 30 and the touch signal TS received by the display driver 210 from the sensor driver 220 are illustrated.

The second interface signal IS2 may have the target frequency TF, and the touch signal TS may have a second frequency FQ2 that is different from the target frequency TF. The period of the second interface signal IS2 may be a length of a period between a time point t3 and a time point t4. The period of the touch signal TS may be the length of the section between the time point t3 and the time point t5. Thus, the second interface signal IS2 and the touch signal TS have different frequencies. As a result, the period of the second interface signal IS2 and the period of the touch signal TS may be different. The time point t3 may be a time point when the display driver 210 receives the second interface signal IS2 and the touch signal TS.

Referring to the time point t4, the logic level of the second interface signal IS2 may be changed, e.g., from a low level to a high level. For example, the time point t4 may be a time point of the rising edge of the second interface signal IS2. Referring to the time point t5, the logic level of the touch signal TS may be changed, e.g., from a low level to a high level. For example, the time point t5 may be a time point of the rising edge of the touch signal TS.

After the display driver 210 receives the second interface signal IS2, because respective logic levels of the second interface signal IS2 and the touch signal TS are different, interference caused by the second interface signal IS2 may be reduced or prevented when sensing a touch based on the touch signal TS.

When interference between the touch signal TS and the second interface signal IS2 is reduced or prevented by changing the frequency of the first interface signal IS1 to the frequency of the second interface signal IS2, it may not be necessary to design the structure of the display device so that the wire through which the touch signal TS is transmitted and the wire through which the second interface signal IS2 is transmitted do not overlap. That is, the structure of the display device may be designed so that the wires of the touch signal TS and the interface signal (IS1/IS2) overlap. Accordingly, dead space inside the display device may be reduced, which, in turn, may allow the display device to be reduced.

Figure 7:
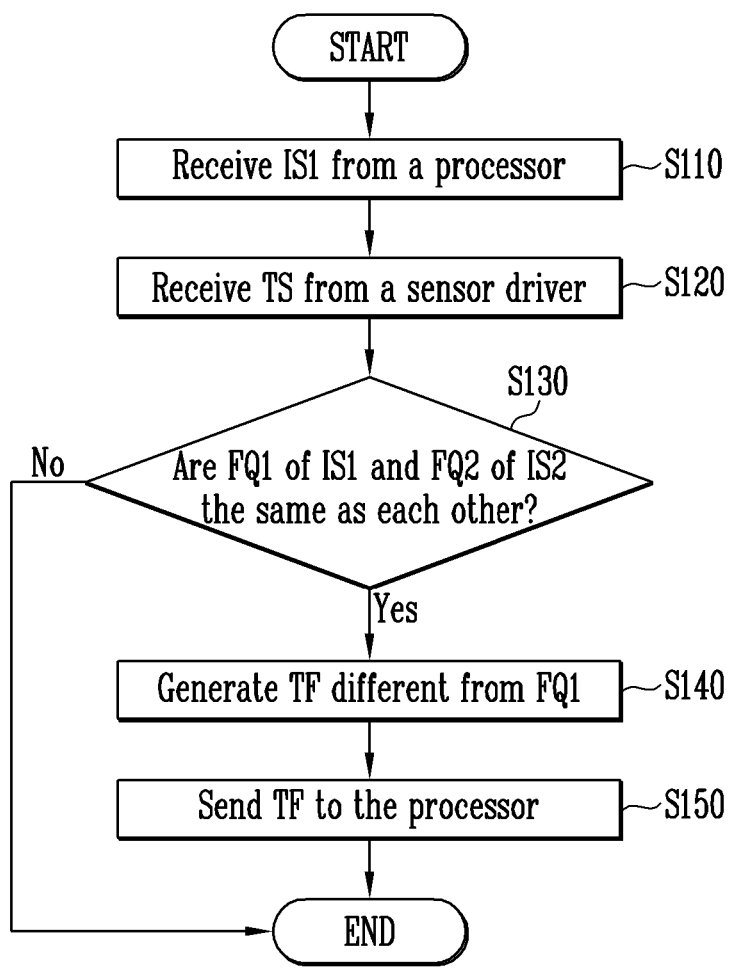
FIG. 7 illustrates a flowchart of a method for operating a display driver according to an embodiment of the present disclosure.

FIG. 7 illustrates a flowchart of a method for operating a display driver according to an embodiment of the present disclosure. More specifically, referring to FIG. 3 and FIG. 7, a method for performing a frequency change operation by the display driver 210 is illustrated.

In operation S110, the display driver 210 may receive the first interface signal IS1 from the processor 30.

In operation S120, the display driver 210 may receive a touch signal TS from the sensor driver 220.

In operation S130, the display driver 210 may compare whether the first frequency FQ1 of the first interface signal IS1 and the second frequency FQ2 of the touch signal TS match. For example, the display driver 210 may calculate the first frequency FQ1 of the first interface signal IS1 and the second frequency FQ2 of the touch signal TS. When the first frequency FQ1 and second frequency FQ2 match, the display driver 210 may perform operation S140. When the first frequency FQ1 and the second frequency FQ2 do not match, the display driver 210 may terminate the frequency change operation.

In operation S140, the display driver 210 may generate the target frequency TF, which is different from the first frequency FQ1. In the embodiment, the display driver 210 may generate the target frequency TF by adding or subtracting a predetermined margin frequency to or from the first frequency FQ1. (In another embodiment, the processor 30 may generate the target frequency TF based on a notification signal from the display driver 210 indicating that the frequencies of the touch signal TS and first interface signal IS1 are the same.)

In operation S150, the display driver 210 may inform the processor 30 of the generated target frequency TF. For example, the display driver 210 may output a feedback signal indicating the target frequency TF to the processor 30. The processor 30 may then generate the second interface signal IS2 at the target frequency and send the second interface signal IS2 to the display driver 210 for driving the display panel.

Figure 8:
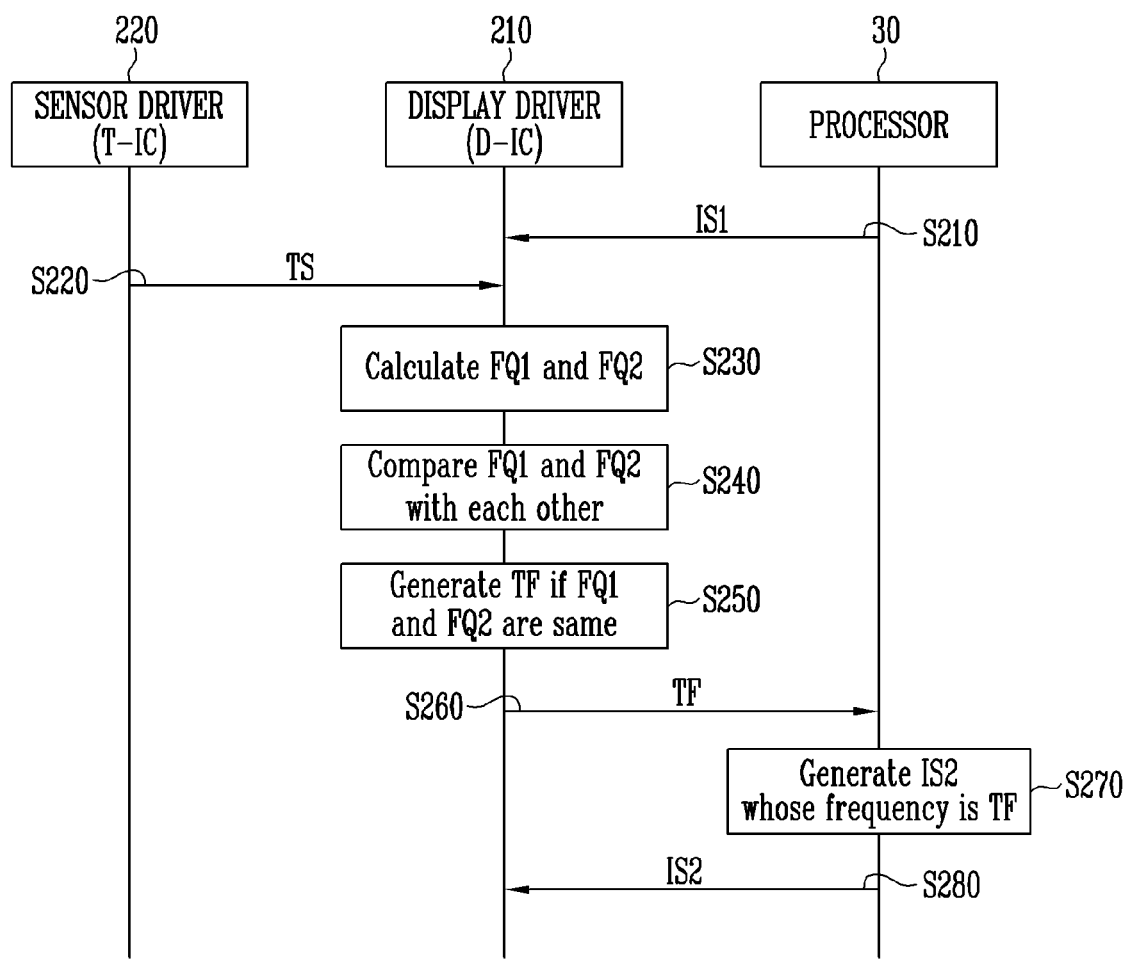
FIG. 8 illustrates a flowchart of a method for operating a display device according to an embodiment of the present disclosure.

FIG. 8 illustrates a flowchart of a method for operating a display device according to an embodiment of the present disclosure.

Referring to FIG. 2 and FIG. 8, a method of operating the display device 2 including the display driver 210, the sensor driver 220, and the processor 30 is illustrated.

In operation S210, the processor 30 may output the first interface signal IS1 to the display driver 210.

In operation S220, the sensor driver 220 may output the touch signal TS to the display driver 210. Although operation S220 has been described as being performed after operation S210, the present disclosure is not limited thereto, and operation S210 may be performed after operation S220, or operation S210 and operation S220 may be simultaneously performed.

In operation S230, the display driver 210 may calculate the first frequency FQ1 of the first interface signal IS1 and the second frequency FQ2 of the touch signal TS.

In operation S240, the display driver 210 may compare whether the first frequency FQ1 and the second frequency FQ2 match.

In operation S250, when the first frequency FQ1 and the second frequency FQ2 match, the display driver 210 may generate the target frequency TF.

In operation S260, the display driver 210 may inform the processor 30 of the target frequency TF. For example, the display driver 210 may output a feedback signal indicating the target frequency TF to the processor 30.

In operation S270, the processor 30 may generate the second interface signal IS2 at the target frequency TF.

In operation S280, the processor 30 may output the second interface signal IS2 to the display driver 210.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, frequency counters, comparators, generators and other signal generating and signal processing features of the embodiments disclosed herein may be implemented, for example, in non-transitory logic that may include hardware, software, or both. When implemented at least partially in hardware, the controllers, processors, frequency counters, comparators, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit. In some embodiments, these features may be implemented by a neural network, machine-learning logic, or other form of artificial intelligence.

When implemented in at least partially in software, the controllers, processors, frequency counters, comparators, generators, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While some embodiments described herein are performed when a wire of the interface signal and a wire of the touch signal overlap, the display device and methods described herein may be applied to other cases, e.g., when the two wires do not overlap.

The technical scope of the present disclosure may be determined by on the technical scope of the accompanying claims. All changes or modifications that come within the meaning and range of the claims and their equivalents will be interpreted as including the range of the present disclosure. The embodiments may be combined to form additional embodiments.

What is claimed is:

1. A driving circuit comprising:
   a sensor driver configured to output a touch signal; and
   a display driver configured to receive a first interface signal from a processor and output a feedback signal indicating a third frequency to the processor when a first frequency of the first interface signal and a second frequency of the touch signal received from the sensor driver match, wherein the third frequency is different from the first frequency.

2. The driving circuit of claim 1, wherein
   the display driver is configured to receive a second interface signal, generated based on the third frequency, from the processor, and
   a time point at which a logic level of the second interface signal changes and a time point at which a logic level of the touch signal changes are different.

3. The driving circuit of claim 1, wherein
   the display driver includes a frequency counter configured to calculate the first frequency of the first interface signal and the second frequency of the touch signal;

a comparator configured to output a change signal depending on whether the first frequency and the second frequency match; and a frequency generator configured to generate the feedback signal indicating the third frequency when receiving the change signal.

4. The driving circuit of claim 3, wherein the comparator is configured to output the change signal to the frequency generator when the first frequency and the second frequency match.

5. The driving circuit of claim 3, wherein the frequency generator is configured to generate the third frequency by adding a margin frequency to the first frequency.

6. The driving circuit of claim 3, wherein the frequency generator is configured to generate the third frequency by subtracting a margin frequency from the first frequency.

7. The driving circuit of claim 3, wherein the frequency counter is configured to calculate the first frequency by counting a number of toggling times of a reference clock signal during a first reference time, and to calculate the second frequency by counting a number of toggling times of the reference clock signal during a second reference time.

8. The driving circuit of claim 7, wherein
the frequency counter includes an oscillator configured to generate the reference clock signal; and
a counter configured to count the number of toggling times of the reference clock signal during the first reference time and count the number of toggling times of the reference clock signal during the second reference time.

9. The driving circuit of claim 1, wherein the display driver is configured to communicate with the processor through a mobile industry processor interface (MIPI) interface.

10. A method for operating a display driver that communicates with a processor and a sensor driver, comprising:
receiving a first interface signal from the processor;
receiving a touch signal from the sensor driver;
comparing whether a first frequency of the first interface signal and a second frequency of the touch signal match; and
when the first frequency and the second frequency match, outputting a feedback signal indicating a third frequency different from the first frequency to the processor.

11. The method of claim 10, further comprising
after outputting the third frequency to the processor, receiving a second interface signal generated based on the third frequency from the processor, wherein a time point at which a logic level of the second interface signal changes and a time point at which a logic level of the touch signal changes are different.

12. The method of claim 10, further comprising
upon receiving the first interface signal from the processor, calculating the first frequency of the first interface signal; and
upon receiving the touch signal from the display driver, calculating the second frequency of the touch signal.

13. The method of claim 10, wherein generating the third frequency includes generating the third frequency by adding a margin frequency to the first frequency.

14. The method of claim 10, wherein generating the third frequency includes generating the third frequency by subtracting a margin frequency to the first frequency.

15. The method of claim 10, wherein the display driver communicates with the processor through a mobile industry processor interface (MIPI) interface.

16. A display device, comprising:
a display driver configured to display an image on a display area based on a first interface signal received from a processor; and
a sensor driver configured to generate sensing data by detecting a touch adjacent to a sensor area through a touch signal, wherein the display driver is configured to output a feedback signal indicating a third frequency to the processor when a first frequency of the first interface signal and a second frequency of the touch signal received from the sensor driver match, and wherein the third frequency is different from the first frequency.

17. The display device of claim 16, wherein
the display driver receives a second interface signal generated based on the third frequency from the processor, and
a time point at which a logic level of the second interface signal changes and a time point at which a logic level of the touch signal changes are different.

18. The display device of claim 16, wherein the display driver includes:
a frequency counter configured to calculate the first frequency of the first interface signal and the second frequency of the touch signal;
a comparator configured to output a change signal depending on whether the first frequency and the second frequency match; and
a frequency generator configured to generate the feedback signal indicating the third frequency when receiving the change signal.

19. The display device of claim 18, wherein the comparator is configured to output the change signal to the frequency generator when the first frequency and the second frequency match.

20. The display device of claim 18, wherein the frequency generator is configured to generate the third frequency by adding a margin frequency to the first frequency.

* * * * *